United States Patent
Werneck et al.

(10) Patent No.: US 10,115,115 B2
(45) Date of Patent: Oct. 30, 2018

(54) ESTIMATING SIMILARITY OF NODES USING ALL-DISTANCES SKETCHES

(71) Applicant: Microsoft Technology Licensing, LLC, Redmond, WA (US)

(72) Inventors: Renato F. Werneck, San Francisco, CA (US); Moises Goldszmidt, Palo Alto, CA (US); Andrew V. Goldberg, Emerald Hills, CA (US); Edith Cohen, Palo Alto, CA (US); Daniel Delling, Sunnyvale, CA (US); Fabian Fuchs, Cleebronn (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 440 days.

(21) Appl. No.: 14/487,162

(22) Filed: Sep. 16, 2014

(65) Prior Publication Data

US 2016/0078148 A1    Mar. 17, 2016

(51) Int. Cl.
*G06Q 30/02* (2012.01)
*G06F 17/30* (2006.01)

(52) U.S. Cl.
CPC ....... *G06Q 30/02* (2013.01); *G06F 17/30964* (2013.01)

(58) Field of Classification Search
CPC .......................... G06F 17/30964; G06Q 30/02
USPC ........................................................ 707/737
See application file for complete search history.

(56) References Cited

U.S. PATENT DOCUMENTS

| | | | |
|---|---|---|---|
| 7,689,452 B2 | 3/2010 | Lam et al. | |
| 7,904,461 B2 | 3/2011 | Baluja et al. | |
| 8,316,056 B2 | 11/2012 | Wable | |
| 8,606,787 B1 | 12/2013 | Asgekar et al. | |
| 2005/0243736 A1* | 11/2005 | Faloutsos | G06Q 10/04 370/254 |
| 2011/0125739 A1 | 5/2011 | Wexler et al. | |
| 2011/0202846 A1* | 8/2011 | Najork | G06N 5/04 715/736 |
| 2012/0072475 A1 | 3/2012 | Morrison et al. | |
| 2013/0339352 A1* | 12/2013 | Jin | G06F 17/30958 707/736 |
| 2014/0214936 A1* | 7/2014 | Abraham | H04W 4/206 709/204 |
| 2014/0244664 A1* | 8/2014 | Verma | G06Q 30/0251 707/749 |

OTHER PUBLICATIONS

Cohen, Edith, "All-Distances Sketches, Revisited: Scalable Estimation of the Distance Distribution and Centralities in Massive Graphs", Submitted on Jun. 14, 2013 (v1), revised Jul. 19, 2013 (this version, v2), pp. 1-23.*

(Continued)

*Primary Examiner* — Pierre Vital
*Assistant Examiner* — Alicia Antoine
(74) *Attorney, Agent, or Firm* — Workman Nydegger (57) ABSTRACT

One or more all-distances sketches are generated for nodes in a graph. An all-distances sketch for a node includes a subset of the nodes of the graph, and a shortest distance between the node and each of the nodes in the subset of nodes. The generated all-distances sketches are used to estimate the closeness similarity of nodes. The estimated closeness similarity can be used for targeted advertising or for content item recommendation, for example.

19 Claims, 6 Drawing Sheets

(56) References Cited

OTHER PUBLICATIONS

Rina Panigrahy, Marc Najork, Yinglian Xie, "How user behavior is related to social affinity", Proceedings of the fifth ACM international conference on Web search and data mining, Feb. 8-12, 2012, Seattle, Washington, USA [doi>10.1145/2124295.2124379].*

Abraham, et al., "Low-Distortion Inference of Latent Similarities from a Multiplex Social Network", In Proceedings of the Twenty-Fourth Annual ACM-SIAM Symposium on Discrete Algorithms, Jan. 6, 2013, 20 pages.

Abraham, et al., "HLDB: Location-Based Services in Databases", In Proceedings of the 20th International Conference on Advances in Geographic Information Systems, Nov. 6, 2012, 10 pages.

Abraham, et al., "Hierarchical Hub Labelings for Shortest Paths", In Technical Report, MSR-TR-MSR-TR-2012-46, Apr. 2012, 15 pages.

Adamic, et al., "How to search a social network", In Proceeding of Social Networks, vol. 27, No. 3, Jul. 2005, 18 pages.

Akiba, "Fast exact shortest-path distance queries on large networks by pruned landmark labeling", In Proceedings of the ACM SIGMOD International Conference on Management of Data, Jun. 22, 2013, 12 pages.

Boldi, et al., "HyperANF: approximating the neighbourhood function of very large graphs on a budget", In Proceedings of the 20th International Conference on World Wide Web, Jan. 27, 2011, 19 pages.

Boldi, et al., "Robustness of social networks: Comparative results based on distance distributions", In Social Informatics—Third International Conference, Oct. 6, 2011, 14 pages.

Bollobas, Bela, "Modern graph theory", In Book of Graduate Texts in Mathematics, vol. 184, Jan. 1998, 3 pages.

Brin, et al., "The Anatomy of a Large-Scale Hypertextual Web Search Engine", In Proceedings of the seventh international conference on World Wide Web 7, Apr. 1, 1998, 10 pages.

Chechik, et al., "Sparse reliable graph backbones", In Information and Computation, vol. 210, Jan. 2012, 13 pages.

Cohen, Edith, "Size-estimation framework with applications to transitive closure and reachability", In Journal of Computer and System, vol. 55, No. 3, Dec. 1997, 24 pages.

Cohen, Edith, "All-Distances Sketches, Revisited: Scalable Estimation of the Distance Distribution and Centralities in Massive Graphs Analysis", In Technical Report cs.DS/1306.3284, Jun. 2013, 15 pages.

Cohen, et al., "Reachability and distance queries via 2-hop labels", In Siam Journal Computing, vol. 32, No. 5, Jan. 6, 2002, 10 pages.

Cohen, et al., "Spatially-Decaying Aggregation Over a Network: Model and Algorithms", In Journal of Computer and System Sciences, vol. 73, Issue 3, May 2007, 6 pages.

Cohen, et al., "Summarizing data using bottom-k sketches", In Proceedings of the twenty-sixth annual ACM symposium on Principles of distributed computing, Aug. 12, 2007, 10 pages.

Cohen, et al., "A case for customizing estimators: Coordinated samples", In Technical Report cs.ST/1212.0243, Dec. 2012, 13 pages.

Cohen, et al., "What you can do with coordinated samples", In Proceeding of Approximation, Randomization, and Combinatorial Optimization Algorithms and Techniques, Aug. 21, 2013, 21 pages.

Crescenzi, et al., "A comparison of three algorithms for approximating the distance distribution in real-world graphs", In Proceedings of the First international ICST conference on Theory and practice of algorithms in (computer) systems, Apr. 18, 2011, 5 pages.

Dangalchev, Chavdar, "Residual closeness in networks", In Proceedings Physica A: Statistical Mechanics and its Applications, vol. 365, Issue 2, Jun. 15, 2006, 2 pages.

Sarma, et al., "A sketch-based distance oracle for web-scale graphs", In Proceedings of the Third ACM International Conference on Web Search and Data Mining, Feb. 4, 2010, 10 pages.

Jeh, et al., "SimRank: a measure of structural-context similarity", In Proceedings of the eighth ACM SIGKDD international conference on Knowledge discovery and data mining, Jul. 23, 2002, 11 pages.

Jones, Karen Sparck, "A statistical interpretation of term specificity and its application in retrieval", In Journal of Documentation, vol. 28, No. 1, Retrieved on: Aug. 5, 2014, 9 pages.

Katz, Leo, "A new status index derived from sociometric analysis", In Proceedings of Psychometrika vol. 8, No. 1, Mar. 1953, 5 pages.

Kleinberg, Jon, "The small-world phenomenon: an algorithm perspective", In Proceedings of the thirty-second annual ACM symposium on Theory of computing, May 1, 2000, 14 pages.

Nowell, et al., "The link-prediction problem for social networks", In Journal of the American Society for Information Science and Technology, vol. 58, Issue 7, May 2007, 23 pages.

Newman, M. E. J., "Clustering and preferential attachment in growing networks", In Proceedings of Physical Review E 64, 025102, Retrieved on: Aug. 5, 2014, 13 pages.

Palmer, et al., "ANF: A Fast and Scalable Tool for Data Mining in Massive Graphs", In Proceedings of the Eighth ACM SIGKDD International Conference on Knowledge Discovery and Data Mining, Jul. 23, 2002, 10 pages.

Panigrahy, et al., "How user behavior is related to social affinity", In Proceedings of the Fifth ACM International Conference on Web Search and Data Mining, Feb. 8, 2012, 10 pages.

Sabidussi, Gert, "The Centrality Index of a Graph", In Proceedings of Psychometrika, Dec. 1966, 4 pages.

Stephenson, et al., "Rethinking centrality: Methods and examples", In Proceedings of Social Networks, vol. 11, Issue 1, Mar. 1989, 2 pages.

Thorup, et al., "Approximate distance oracles", In Proceedings of the thirty-third annual ACM symposium on Theory of computing, Jul. 6, 2001, 10 pages.

Tong, et al., "Fast Random Walk with Restart and its Applications", In Proceedings of the Sixth International Conference on Data Mining, Dec. 18, 2006, 10 pages.

Cohen, Edith, "All-Distances Sketches, Revisited: HIP Estimators for Massive Graphs Analysis", In Proceedings of International Conference on Management of Data, PODS, Jun. 22, 2014, 12 pages.

Song, et al., "Clustered Embedding of Massive Social Networks", In Proceedings of the 12th ACM Sigmetrics/Performance joint international conference on Measurement and Modeling of Computer Systems, Jun. 11, 2012, 12 pages.

Satuluri, et al., "Local Graph Sparsification for Scalable Clustering", In Proceedings of the ACM SIGMOD International Conference on Management of data, Jun. 12, 2011, 12 pages.

Kajdanowicz, et al., "Label-dependent Feature Extraction in Social Networks for Node Classification", In Proceedings of the Second international conference on Social informatics, Oct. 27, 2010, 15 pages.

"Practical Graph Mining with R-Link Analysis", Retrieved on: Jul. 28, 2014, Available at: http://www.csc.ncsu.edu/faculty/sarnatova/practical-graph-mining-with-R/slides/pdf/Link_Analysis.pdf.

International Search Report and the Written Opinion issued in PCT Patent Application No. PCT/US2016/063716 dated Feb. 10, 2017.

* cited by examiner

ESTIMATING SIMILARITY OF NODES USING ALL-DISTANCES SKETCHES

BACKGROUND

Graphs are often used to model relationships between entities such as links between websites on the Internet, and between users of social networking applications. With respect to social networks, these graphs may include a node for each user account and a link between nodes that represent social networking relationships between the nodes (e.g., "friends").

These graphs may be used for a variety of purposes. One use of graphs is to estimate the similarity of nodes in the graph. The similarity of nodes may be used for a variety of purposes including content item recommendation and targeted advertising.

As may be appreciated, such graphs may be extremely large and may include millions or even billions of nodes and edges. As a result, many current techniques for determining the similarity of nodes focus on smaller subsets of the graph. For example, techniques may only consider nodes that are directly connected to a node (or some other degree) when determining the similarity of nodes. However, by limiting the determination to graph subsets, valuable information related to node similarity and node relationships may be lost.

SUMMARY

One or more all-distances sketches are generated for nodes in a graph. An all-distances sketch for a node includes a subset of the nodes of the graph, and a shortest distance between the node and each of the nodes in the subset of nodes. The generated all-distances sketches are used to estimate the closeness similarity of nodes. The estimated closeness similarity can be used for targeted advertising or for content item recommendation.

In an implementation, an indication of a first node and an indication of a second node, of a plurality of nodes comprising a graph, are received by a computing device. All-distances sketches of the first node and all-distances sketches of the second node are retrieved by the computing device. The similarity of the first node and the second node are estimated using the all-distances sketches of the first node and the all-distances sketches of the second node by the computing device. The estimated similarity is provided in response to the indication of the first node and the indication of the second node by the computing device.

In an implementation, a graph is received by a computing device. The graph includes nodes and edges, and each edge includes a weight. Adjusted graphs are generated from the graph by the computing device by, for each adjusted graph, adjusting the weights of the edges of the graph to generate the adjusted graph, wherein each adjusted graph has the same nodes as the graph. For each node of the graph, an all-distances sketch is generated for the node by the computing device. An all-distances sketch for a node includes a subset of the nodes and a shortest distance between the associated node and each node of the subset of the nodes. For each node of each adjusted graph, an all-distances sketch is generated for the node by the computing device. For each node, the node is associated with the all-distances sketches generated for the node from the graph and each of the adjusted graphs by the computing device.

This summary is provided to introduce a selection of concepts in a simplified form that are further described below in the detailed description. This summary is not intended to identify key or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
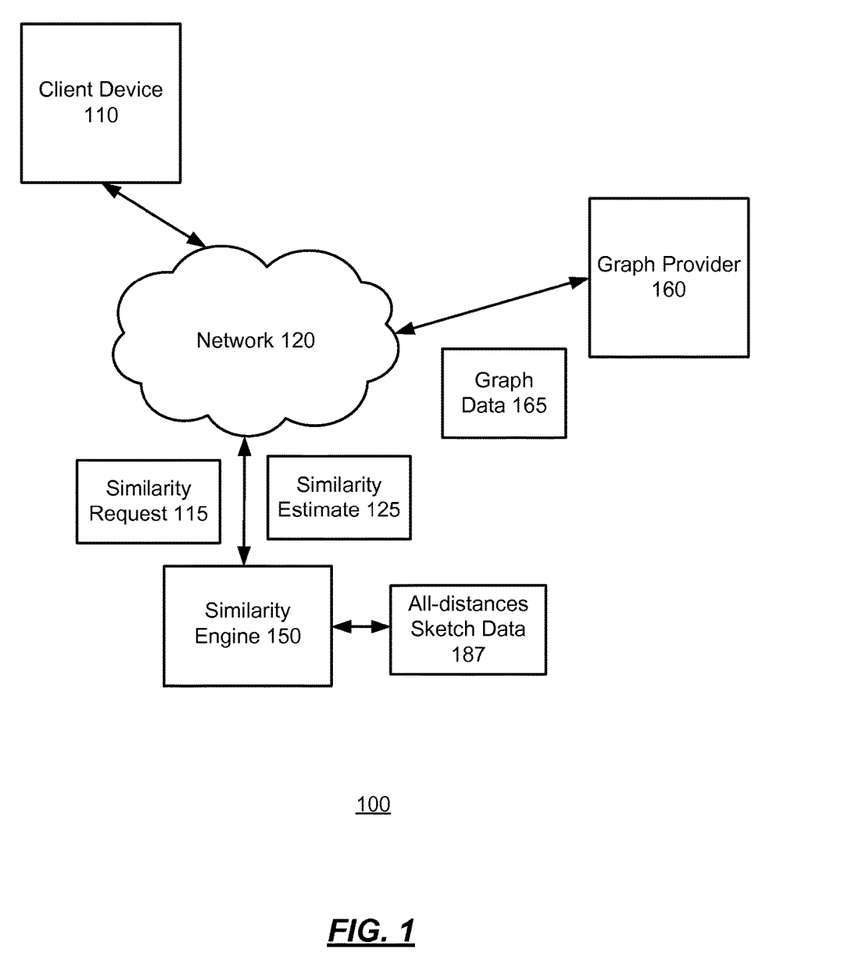
FIG. 1 shows an environment for estimating the closeness similarity of nodes in a graph.

FIG. 1 shows an environment 100 for estimating the closeness similarity of nodes in a graph. The environment 100 may include a graph provider 160 that provides the graph. The graph may represent a social network or webpages on the Internet, for example. The graph may include a plurality of nodes connected to each other through a plurality of edges. Depending on what the graph represents, the graph may be weighted or un-weighted, and may be directed or undirected. The graph may be stored as the graph data 165.

For example, where the graph represents a social networking application, each node in the graph may represent a user account in the social networking application, and each edge between two nodes may represent a social networking relationship between the two nodes. The social networking relationship may include "friend" or "follower" relationships, for example.

Depending on the implementation, the weight associated with an edge may represent the relative strength of the social networking relationship associated with the edge. The strength of the social networking relationship may be measured using a variety of metrics including the number of direct messages sent between the user accounts, the number of "wall" posts made by the users, and the number of indicators of interest provided by the user accounts with respect to each other (e.g., "likes"), for example. Other methods for measuring the strength of a social networking relationship may be used.

Determining the similarity of nodes in the graph may be useful for a variety of purposes such as targeted advertising, content item recommendations, or recommendations of other user accounts in the social network. Content items may include, for example, videos, books, or music, or websites that a user may be interested in. As an example, if a first user account is very similar to a second user account, the videos that the second user account viewed and/or expressed an interest in may be recommended to the first user account, and vice versa.

One measure of the similarity of two nodes is described herein as "closeness similarity." The closeness similarity is a measure of the similarity of two nodes based on their views of the entire graph. In one implementation, the closeness similarity of two nodes may be determined by, for each node, determining the shortest distance between the node and each of the other nodes in the graph. These distances may form a distance vector for each of the two nodes. The closeness similarity of the two nodes may be determined using the two distance vectors.

As may be appreciated, because the number of nodes in the graph may be extremely large, computing the distance vectors used to calculate the closeness similarity of two nodes may be computationally expensive. Moreover, because the size of the graph may be constantly changing, including adding or removing nodes and edges, the distance vectors may need to be regularly recalculated.

Accordingly, the environment 100 may further include a similarity engine 150. The similarity engine 150 may estimate the closeness similarity of two nodes using one or more all-distances sketches associated with each node the graph. An all-distances sketch for a node v includes a random subset of nodes from the graph, where the inclusion probability of a node U in the subset decreases with its distance from v. Each all-distances sketch for a node v includes the shortest distance in the graph between the node v, and each of the other nodes in the subset of nodes. An all-distances sketch for a node v may be represented by a vector with a tuple for each node in the subset with its associated shortest distance from the node v in the graph. More formally, a node U belongs to ADS(v) if U is among the k nodes with lowest rank r within a ball of radius $d_{vu}$ (i.e., distance from v to U) around v.

In some implementations, the all-distances sketches are coordinated, meaning that the inclusion of a node in a particular all-distances sketch is positively correlated with the node being included in other all-distances sketches. An all-distances sketch is an extension of the well-known min-hash sketch, and the all-distances sketch of a node v may be the union of coordinated min-hash sketches of all the sets of the i closest nodes to v.

The similarity engine 150 may estimate the closeness similarity of two nodes using the all-distances sketches. In some implementations, the similarity engine 150 may estimate the closeness similarity of a node n and a node z based the number of nodes from the all-distances sketches of the node n and z that are the same. For example, the closeness similarity may be a ratio of the number of nodes from the all-distances sketches of the node n and z that are the same to the total number of distinct nodes in the all-distances sketches of n and z.

The similarity engine 150 and the graph provider 160 may communicate through a network 120. In addition, both the similarity engine 150 and the graph provider 160 may also communicate with one or more client devices 110 through the network 120. Each of the client devices 110 may include a desktop personal computer, workstation, laptop, personal digital assistant (PDA), smartphone, cell phone, or any WAP-enabled device or any other computing device capable of interfacing directly or indirectly with the network 120. The network 120 may be a variety of network types including the public switched telephone network (PSTN), a cellular telephone network, and a packet switched network (e.g., the Internet).

Although one graph provider 160, one similarity engine 150, and one client device 110 are shown, it is for illustrative purposes only; there is no limit to the number of graph providers, similarity engines, and client devices that may be supported in the environment 100. The graph provider 160, the similarity engine 150, and the client device 110 may be implemented together or separately using one or more computing devices such as the computing device 600 described with respect to FIG. 6.

Depending on the implementation, the similarity engine 150 may generate the all-distances sketches for each node of a graph. Alternatively, the all-distances sketches may be generated by the graph provider 160 and may be received by the similarity engine 150 as part of the graph data 165. The all-distances sketches, whether received or generated by the similarity engine 150, may be stored as the all-distances sketch data 187.

The similarity engine 150 may receive a similarity request 115 from a client device 110. The similarity request 115 may include an indicator of a first node from the graph and an indicator of a second node from the graph. The similarity engine 150 may retrieve the all-distances sketches associated with the indicated first node and the indicated second node, and may estimate the closeness similarity using the retrieved all-distances sketches. The estimated similarity may be provided to the client device 110 as the similarity estimate 125. The similarity estimate 125 may be used by the client device 110 for a variety of purposes such as content item recommendation and targeted advertising, for example.

In some implementations, to reduce noise in the graph, the similarity engine 150 may generate multiple all-distances sketches for each node in the graph, and may estimate the closeness similarity of two nodes using some or all of the generated all-distances sketches. The similarity engine 150 may generate each of the multiple all-distances sketches for a node from what are referred to herein as "adjusted graphs." An adjusted graph is a version of the graph where the weights associated with the edges of the graph have been multiplied by one or more values. Each adjusted graph may be otherwise identical to the original graph including nodes and edges. Depending on the implementation, the multiplier values may be between 0 and 1 and may be randomly selected from a distribution. Other methods for selecting values may be used. Each edge in each adjusted graph may have its weight multiplied by different random values.

The similarity engine 150, when estimating the similarity of two nodes, may retrieve some or all of the all-distances sketches generated for the nodes, and may estimate the similarity using the retrieved all distances sketches. In some implementations, the similarity engine 150 may, for each adjusted graph, estimate the similarity of the nodes using the all-distances sketches generated from that adjusted graph. The similarity engine 150 may combine all of the generated estimates for each adjusted graph into a single combined estimate. For example, the similarity engine 150 may average each of the estimates to form a combined estimate. The combined estimate may be provided as the similarity estimate 125.

As may be appreciated, by using the all-distances sketches generated for the adjusted graphs, noise from weakly connected nodes may be reduced. Nodes that are connected by many paths in the graph have a stronger connection than nodes that are connected by fewer paths in the graph. Often these single connections may not represent true social networking relationships but instead may be associated with fake or abandoned accounts in the social networking application, for example. However, for purposes of the shortest distance calculation, these single path connections may be used in calculating the shortest path between nodes and may therefore skew the closeness similarity estimate.

By adjusting the edge weights in the adjusted graphs, nodes that are strongly connected (i.e., multiple paths) are likely to have at least one path that remains highly weighted in an adjusted graph. Similarly, for nodes that are weakly connected (e.g., a single path), it is unlikely that this path will be highly weighted across all of the adjusted graphs. Thus, by using multiple adjusted graphs, the contribution of the weakly connected nodes to the shortest distance calculation is reduced.

Figure 2:
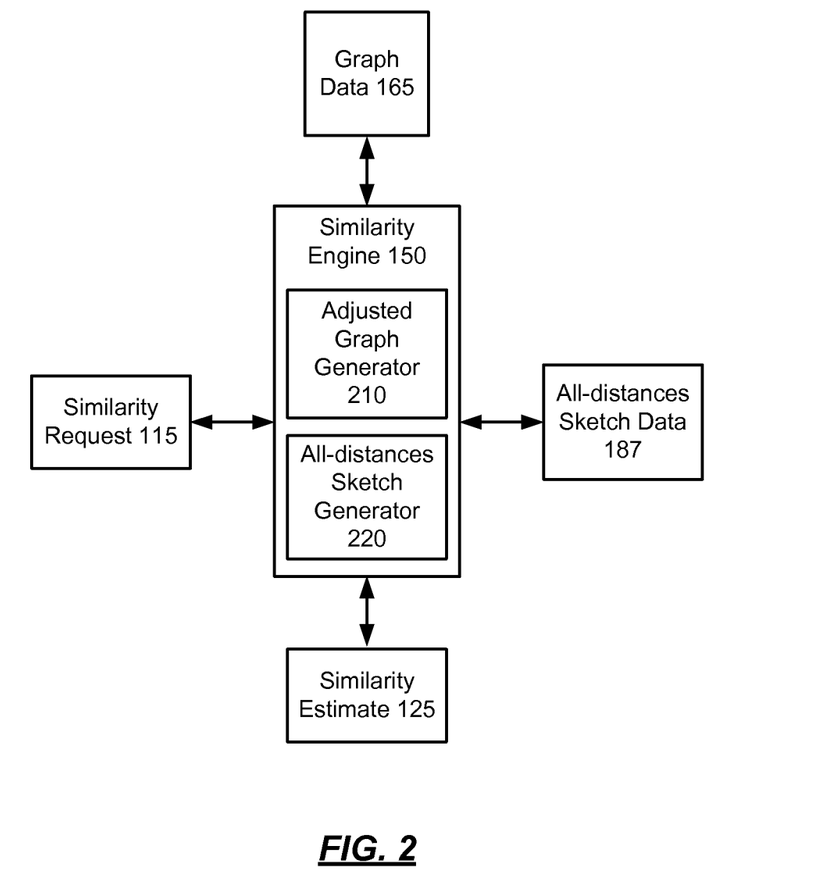
FIG. 2 is an illustration of an exemplary similarity engine.

FIG. 2 is an illustration of an exemplary similarity engine 150. As shown, the similarity engine 150 may include several components such as an adjusted graph generator 210 and an all-distances sketch generator 220. More or fewer components may be supported by the similarity engine 150.

The adjusted graph generator 210 may generate a plurality of adjusted graphs from the graph of the graph data 165. The adjusted graph generator 210 may generate an adjusted graph by, for each edge in the graph, adjusting the weight associated with edge. The weight may be randomly adjusted. In an implementation, the adjusted graph generator 210 may generate an adjusted graph by, for each edge in the graph, multiplying the weight associated with the edge by a randomly selected number. The number may be randomly selected from a distribution. In one implementation, each edge may be multiplied by the natural log of a random number between 0 and 1, e.g., ln(u) where u is a random number between 0 and 1.

As described above, the graph may be a weighted or an un-weighted graph. Where the graph is un-weighted, the adjusted graph generator 210 may generate an adjusted graph by assigning a constant weight to each of the edges of the graph, and then adjusting each weight as described above. The constant weight may be one, for example. Other values may be used.

Depending on the implementation, the adjusted graph generator 210 may remove edges from an adjusted graph if the weight associated with an edge falls below a threshold weight. The threshold weight may be selected by a user or administrator.

The number of adjusted graphs generated by the adjusted graph generator 210 may be set by a user or an administrator, for example. In one implementation, sixteen adjusted graphs are generated; however, there is no minimum or maximum number of adjusted graphs that may be generated by the adjusted graph generator 210. The number of adjusted graphs that are generated may be set by a user or an administrator, for example. The generated adjusted graphs may be stored by the adjusted graph generator 210 with the graph data 165. Alternatively or additionally, the adjusted graphs may not be stored and may be generated as needed to generate the one or more all-distances sketches.

The all-distances sketch generator 220 may generate one or more all-distances sketches based on one or more of the graphs in the graph data 165. The graph data 165 may include the received original graph along with the generated adjusted graphs, if any. The all-distances sketch generator 220 may generate an all-distances sketch for each node of each graph, and may associate the generated all-distances sketches with the nodes as the all-distances sketch data 187. The all-distances sketch generator 220 may generate each all-distances sketch using a variety of methods including a breadth first search or dynamic programming based algorithm. Other methods may be used. Alternatively or additionally, the all-distances sketches may be generated by another source and may be received and stored by the all-distances sketch generator 220 as the all-distances sketch data 187.

The similarity engine 150 may receive a similarity request 115 from a client device 110. The similarity request 115 may indicate two nodes from the graph. In response to the request, the similarity engine 150 may retrieve the all-distances sketches associated with each of the nodes indicated in the similarity request 115 from the all-distances sketch data 187. In implementations where no adjusted graphs are used, the similarity engine 150 may retrieve one all-distances sketch for each node indicated in the similarity request 115.

In implementations using adjusted graphs, the similarity engine 150 may retrieve an all-distances sketch for each indicated node for each of the adjusted graphs. For example, where there are four adjusted graphs, the similarity engine 150 may retrieve four all-distances sketches for each node indicated by the similarity request 115.

Where no adjusted graphs are used, the similarity engine 150 may estimate the closeness similarity of a node u and a node v using the following formula 1 where ADS(u) is the all-distances sketch generated for the node u and ADS(v) is the all-distances sketch generated for the node v:

$$\text{closeness}(u, v) = \frac{|ADS(u) \cap ADS(v)|}{|ADS(u) \cup ADS(v)|} \quad (1)$$

Depending on the implementation, the numerator of the formula 1 may be determined by the similarity engine 150 based on a count the number of nodes of the subset of nodes that make up each all-distances sketch that have the same, or approximately the same, associated shortest distance for both the all-distances sketch of the node v and the all distances sketch of the node u. The denominator of the formula 1 may be determined by the similarity engine 150 based on the total number of nodes in the subset of nodes included in the all-distances sketches. Other methods for calculating the closeness similarity based on the all-distances sketches may be used.

The similarity engine 150 may provide the result of the calculation as the similarity estimate 125. The similarity estimate 125 may be provided to the client device 115 that provided the similarity request 115.

Where adjusted graphs are used, the similarity engine 150 may generate an estimate of the closeness similarity of the nodes u and v for each of the adjusted graphs. The estimate may be generated by the similarity engine 150 using the formula 1. The similarity engine 150 may generate a similarity estimate for the node u and the node v with respect to an adjusted graph using the all-distances sketches generated for the nodes u and Y from that adjusted graph.

The similarity engine 150 may combine the estimated closeness similarities for each of the adjusted graphs into a combined similarity estimate. The combined similarity estimate may be provided by the similarity engine 150 to the client device 115 as described above. Depending on the implementation, the combined closeness similarities may include only the estimated closeness similarities for the adjusted graphs, or may also include an estimated closeness similarity based on the original graph (i.e., the non-adjusted graph). The combined estimated similarities may be provided by the similarity engine 150 as the similarity estimate 125.

Depending on the implementation, the similarity engine 150 may generate the combined estimate, by averaging the estimated similarities generated for each of the adjusted graphs, and optionally the estimated similarity generated for the original graph. Any type of average may be used and may include the mean, median, and mode, for example.

Figure 3:
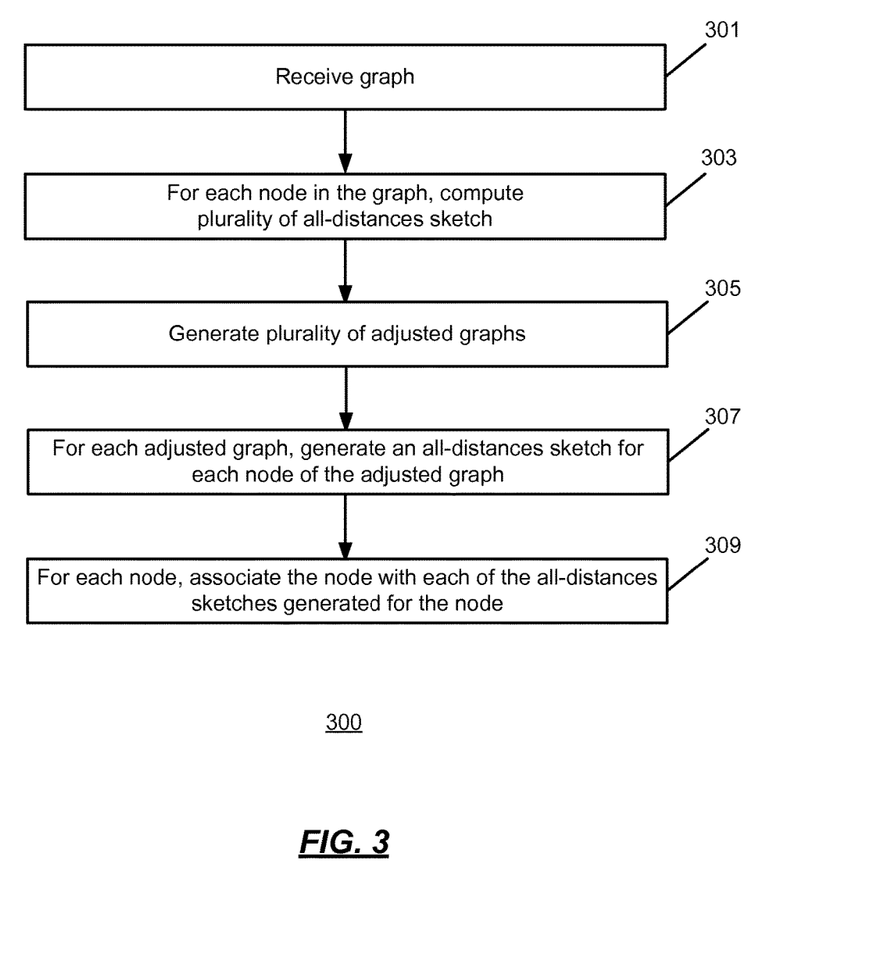
FIG. 3 is an operational flow of an implementation of a method for generating all-distances sketches for nodes of a graph.

FIG. 3 is an operational flow of an implementation of a method 300 for generating all-distances sketches for nodes of a graph. The method 300 may be implemented by the similarity engine 150, for example.

At 301, a graph is received. The graph may be received by the similarity engine 150 from the graph provider 160 as part of the graph data 165. The graph may include a plurality of nodes and a plurality of edges. The graph may be a weighted or an un-weighted graph and may be directed or undirected. Depending on the implementation, the graph may represent user accounts in a social network.

At 303, for each node in the graph, an all-distances sketch is computed. Each all-distances sketch may be computed by the all-distances sketch generator 220 of the similarity engine 150 and stored as the all-distances sketch data 187. An all-distances sketch for a node may include a length of a shortest path between the node and each node in a subset of nodes of the graph. The nodes in the subset may be randomly selected from the graph by the all-distances sketch generator 220.

At 305, a plurality of adjusted graphs is generated. The plurality of adjusted graphs may be generated by the adjusted graph generator 210 of the similarity engine 150. In some implementations, each adjusted graph may be generated by adjusting the weights of the edges of the graph to generate the adjusted graph. The weights may be randomly adjusted by multiplying each edge weight by a randomly selected value. Where the graph is un-weighted, each edge may be assigned a randomly selected weight. The generated adjusted graphs may be stored with the graph data 165.

At 307, for each adjusted graph, an all-distances sketch is generated for each node of the adjusted graph. Each all-distances sketch may be computed by the all-distances sketch generator 220 of the similarity engine 150. Depending on the implementation, each all-distances sketch may identify the same subset of nodes.

At 309, for each node, the node is associated with each of the all-distances sketches generated for the node. A node may be associated with the all-distances sketch generated for the node using the graph, as well as the all-distances sketches generated for the node with respect to each of the adjusted graphs by the similarity engine 150. Depending on the implementation, the all-distances sketches may be associated with the node in the all-distances sketch data 187.

Figure 4:
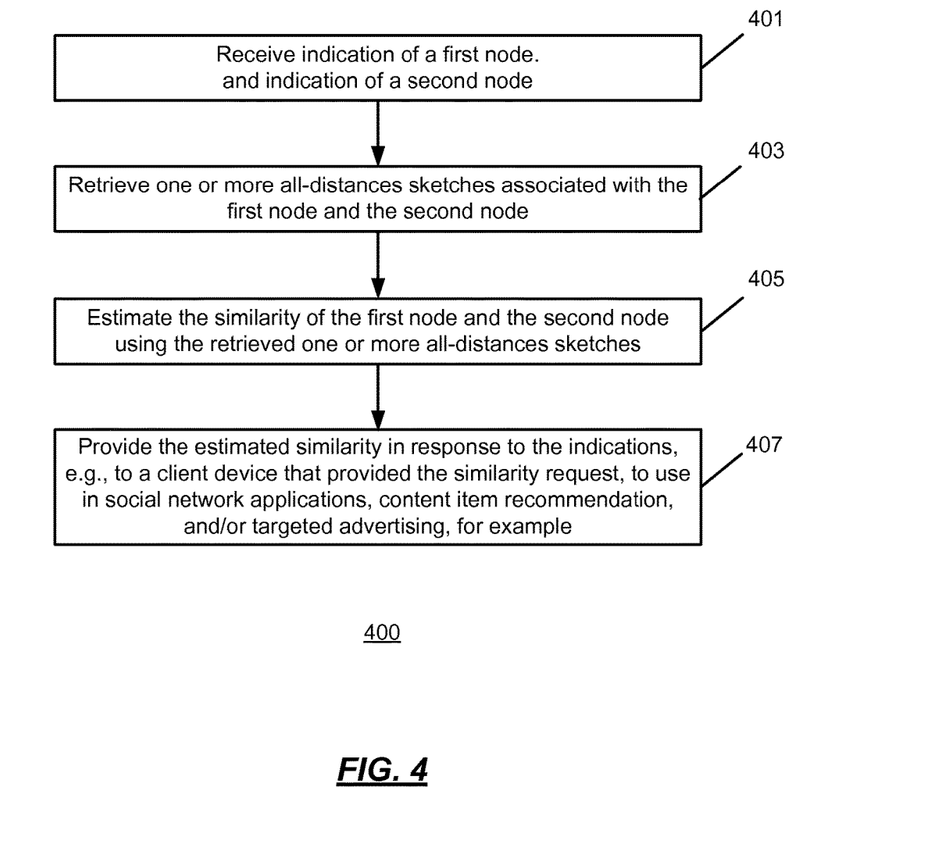
FIG. 4 is an operational flow of an implementation of a method for estimating the similarity of two nodes.

FIG. 4 is an operational flow of an implementation of a method 400 for estimating the similarity of two nodes. The method 400 may be implemented by the similarity engine 150, for example.

At 401, an indication of a first node and an indication of a second node are received. The indications may be received by the similarity engine 150 as part of a similarity request 115 from a client device 110. The similarity request 115 may be a request to estimate the closeness similarity of the first node and the second node. The first and second nodes may be nodes of a graph, and each node may represent a user account in a social network. The closeness similarity may be used to recommend content items or to provide targeted advertisements to users associated with either the first or second nodes.

At 403, one or more all-distances sketches associated with the first and second nodes are retrieved. The all-distances sketches may be retrieved by the similarity engine 150 from the all-distances sketch data 187. In implementations without adjusted graphs, the similarity engine 150 may retrieve one all-distances sketch for the first node and one all-distances sketch for the second node from the all-distances sketch data 187.

In implementations using adjusted graphs, an all-distances sketch for each of the adjusted graphs is retrieved for both the first node and the second node. Each adjusted graph may have the same nodes as the original graph, but may have a different set of randomly adjusted weights for the edges of the graph.

At 405, the similarity of the first node and the second node is estimated using the retrieved one or more all-distances sketches. The estimated similarity may be the closeness similarity and may be estimated by the similarity engine 150 using the formula 1 described above.

In implementations with adjusted graphs, the similarity engine 150, for each adjusted graph and the original graph, may estimate the closeness similarity of the first node and the second node using the all-distances sketches of the first node and the second node that were generated using the graph as described above. Each of these estimated closeness similarities may be combined or averaged together to form the overall or final closeness similarity estimate. Any type of average may be used. Depending on the implementation, the average may be weighted to favor closeness similarity estimates from the original graph or selected adjusted graphs. Moreover, outlying closeness similarity estimates may be removed or discarded.

At 407, the estimated similarity is provided in response to the received indications. The similarity estimate 125 may be provided by the similarity engine 150 to the client device 110 that provided the similarity request 115, to use in social network applications, content item recommendation, and/or targeted advertising, for example.

Figure 5:
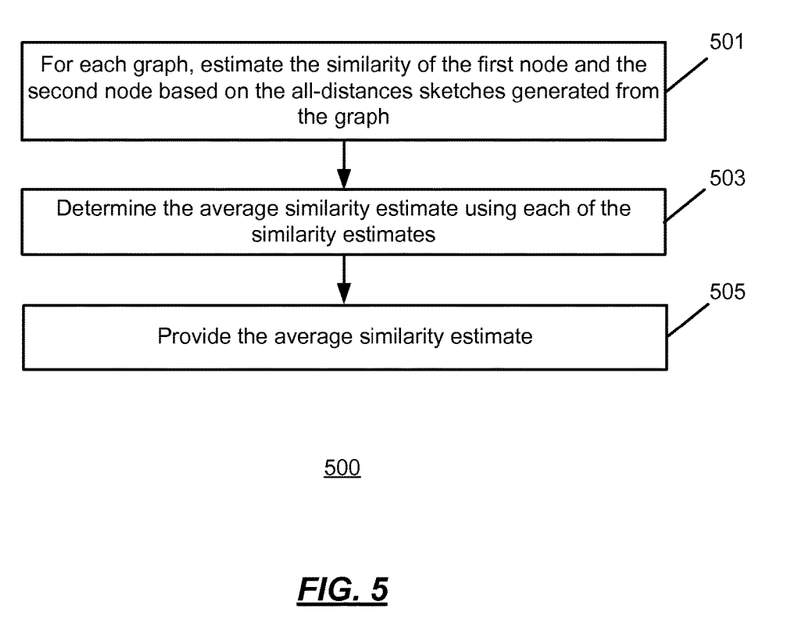
FIG. 5 is an operational flow of an implementation of a method for providing an average similarity estimate for two nodes.

FIG. 5 is an operational flow of an implementation of a method 500 for providing an average similarity estimate for two nodes. The method 500 may be implemented by the similarity engine 150, for example.

At 501, for each graph, the similarity of a first node and a second node are estimated based on the all-distances sketches generated for the first node and the second node from the graph. In an implementation, the similarity may be the closeness similarity and may be estimated by the similarity engine 150. The graphs may include the original graph and each of the adjusted graphs. Alternatively, the graphs may only include the adjusted graphs.

In some implementations, the estimated similarity for two all-distances sketches may be based on the number of tuples that are the same between the two all-distances sketches. Two tuples may be the same if they identify the same node and have the same associated shortest distance. Alternatively, two tuples may be the same if they identify the same node and have shortest distances that are the same.

At 503, an average estimated similarity is determined. The average estimated similarity may be determined by the similarity engine 150 using some or all of the estimated similarities for each graph. The average may be determined using any method or technique for averaging values.

At 505, the average similarity estimate is provided. The average estimated similarity may be provided, to a client device that requested the information, by the similarity engine 150 as the similarity estimate 125.

Figure 6:
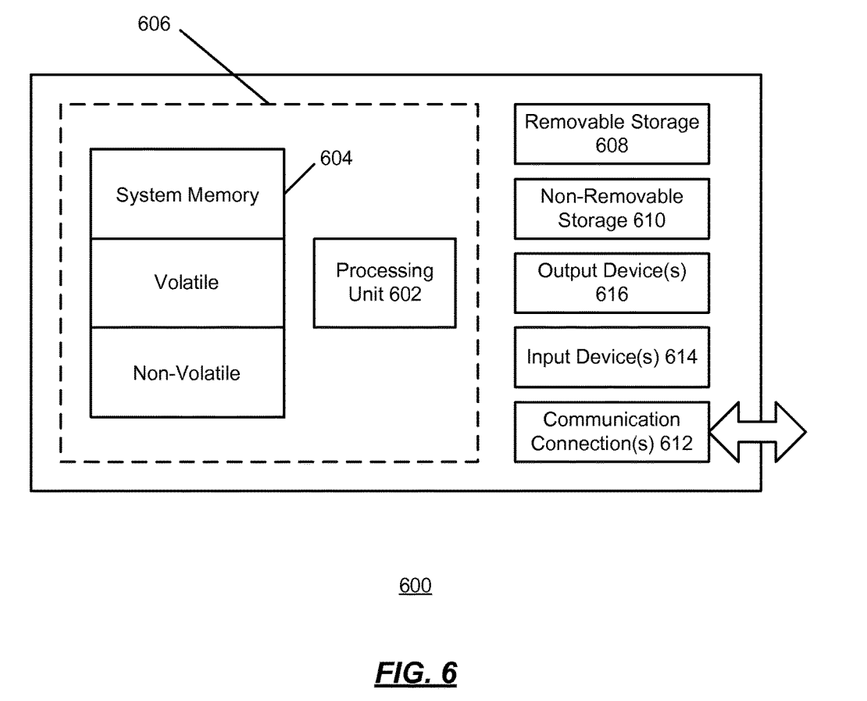
FIG. 6 shows an exemplary computing environment.

FIG. 6 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method implemented by a computing system for determining similarities between nodes in a computing network, the method comprising:

the computing system receiving an indication of a first node and an indication of a second node by a computing device, wherein the first node and the second node are comprised within a plurality of nodes comprising a graph;

the computing system, for each node of the graph, generating an all-distances sketch for the node, wherein the all-distances sketch of a node comprises (1) a selection of a random subset of the plurality of nodes from the graph that is based at least in part on an inclusion probability of each of the plurality of nodes, and (2) a shortest distance between the associated node and each node of the subset of the plurality of nodes, wherein the inclusion probability of each node of the plurality of nodes is a value that decreases based on a determined increase in a distance between each node from the associated node for which the all-distances sketch is being generated, such that a node that is closer to the associated node than a more remote node has a greater inclusion probability of being included in the selected random subset of the plurality of nodes in the all-distance sketch than the more remote node;

the computing system retrieving a plurality of all-distances sketches of the first node and a plurality of all-distances sketches of the second node;

the computing system estimating the similarity of the first node and the second node using the plurality of all-distances sketches of the first node and the plurality of all-distances sketches of the second node by at least determining a ratio of nodes in the plurality of all-distances sketches of the first node that are the same as corresponding nodes in the plurality of all-distances sketches of the second node; and the computing system providing the estimated similarity of the first node and the second node in response to the indication of the first node and the indication of the second node.

2. The method of claim 1, further comprising using the estimated similarity for one or more of targeted advertising or content item recommendation.

3. The method of claim 1, wherein the graph further comprises a plurality of edges, and each edge comprises a weight, and further comprising:

generating a plurality of adjusted graphs from the graph by, for each adjusted graph, adjusting the weights of the edges of the graph to generate the adjusted graph, wherein each adjusted graph has the same nodes as the graph; and for each adjusted graph:
for each node of the adjusted graph, generating an all-distances sketch for the node from the adjusted graph.

4. The method of claim 3, wherein retrieving the plurality of all-distances sketches of the first node and the plurality of all-distances sketches of the second node comprises:

retrieving the generated all-distances sketch for the first node from the graph;

retrieving the generated all-distances sketch for the second node from the graph;

retrieving the generated all-distances sketches for the first node from each of the adjusted graphs; and retrieving the generated all-distances sketches for the second node from each of the adjusted graphs.

5. The method of claim 3, wherein the weight associated with each edge is one.

6. The method of claim 3, wherein the weight associated with each edge is based on a social networking relationship between nodes associated with the edge.

7. The method of claim 3, wherein adjusting the weights of the edges of the graph to generate the adjusted graph comprises multiplying each weight by a random number.

8. The method of claim 3, wherein adjusting the weights of the edges of the graph to generate the adjusted graph comprises multiplying each weight by the natural log of a random number between 0 and 1.

9. The method of claim 4, wherein estimating the similarity of the first node and the second node using the all-distances sketches associated with the first node and the all-distances sketches associated with the second node comprises:

for each adjusted graph, estimating the similarity of the first node and the similarity of the second node using the all-distances sketches generated for the adjusted graph; and averaging the generated similarity estimates to estimate the similarity of the first node and the second node.

10. A system comprising:
at least one computing device;
a similarity engine adapted to:

receive a graph, wherein the graph comprises a plurality of nodes and a plurality of edges;

for each node of the graph, generate an all-distances sketch for the node, wherein an all-distances sketch of a node comprises (1) a selection of a random subset of the plurality of nodes from the graph that is based at least in part on an inclusion probability of each of the plurality of nodes, and (2) a distance between the associated node and each node of the subset of the plurality of nodes, wherein the inclusion probability of each node of the plurality of nodes is a value that decreases based on a determined increase in a distance between each node from the associated node for which the all-distances sketch is being generated, such that a node that is closer to the associated node than a more remote node has a greater inclusion probability of being included in the selection random subset of the plurality of nodes in the all-distances sketch than the more remote node;

receive an indication of a first node and an indication of a second node, wherein the first node and the second node are within the plurality of nodes of the graph; and estimate the similarity of the first node and the second node using the all-distances sketch of the first node and the all-distances sketch of the second node by at least determining a ratio of nodes in the plurality of all-distances sketches of the first node that are the same as corresponding nodes in the plurality of all-distances sketches of the second node; and provide the estimated similarity of the first node and the second node in response to the indication of the first node and the indication of the second node.

11. The system of claim 10, wherein the similarity engine is further adapted to use the estimated similarity for one or more of targeted advertising or content item recommendation.

12. The system of claim 10, wherein the graph is a graph of a social network.

13. The system of claim 10, wherein the distance between the associated node and each node of the random subset of the plurality of nodes is less than a predetermined threshold.

14. The system of claim 10, wherein the similarity engine further generates an additional all distance-sketch for each node of the graph, wherein the estimation of the similarity of the first node and the second node uses all of the all distance-sketches generated for each of the first node and the second node of the graph.

15. A computer program product comprising one or more computer hardware storage device having stored computer-executable instructions which are executable by one or more processors of a computing system to cause the computing system to implement a method for determining similarities between nodes in a computing network, wherein the method includes:

the computing system receiving an indication of a first node and an indication of a second node, wherein the first node and the second node are comprised within a plurality of nodes comprising a graph;

the computing system, for each node of the graph, generating an all-distances sketch for the node, wherein the all-distances sketch of a node comprises (1) a selection of a random subset of the plurality of nodes from the graph that is based at least in part on an inclusion probability of each of the plurality of nodes, and (2) a shortest distance between the associated node and each node of the subset of the plurality of nodes, wherein the inclusion probability of each node of the plurality of nodes is a value that decreases based on a determined increase in a distance between each node from the associated node for which the all-distances sketch is being generated, such that a node that is closer to the associated node than a more remote node has a greater inclusion probability of being included in the selected random subset of the plurality of nodes in the all-distance sketch than the more remote node;

the computing system retrieving a plurality of all-distances sketches of the first node and a plurality of all-distances sketches of the second node;

the computing system estimating the similarity of the first node and the second node using the plurality of all-distances sketches of the first node and the plurality of all-distances sketches of the second node by at least determining a ratio of nodes in the plurality of all-distances sketches of the first node that are the same as corresponding nodes in the plurality of all-distances sketches of the second node; and the computing system providing the estimated similarity of the first node and the second node in response to the indication of the first node and the indication of the second node.

16. The computer program product of claim 15, wherein the method further includes the estimated similarity is used for one or more of targeted advertising or content item recommendation.

17. The computer program product of claim 15, wherein the graph further comprises a plurality of edges, and each edge comprises a weight based on a social networking relationship between nodes associated with the edge, and further comprising:

generating a plurality of adjusted graphs from the graph by, for each adjusted graph, adjusting the weights of the edges of the graph to generate the adjusted graph, by at least multiplying each weight by a random number, wherein each adjusted graph has the same nodes as the graph; and for each adjusted graph:
for each node of the adjusted graph, generating an all-distances sketch for the node from the adjusted graph.

18. The computer program product of claim 17, wherein retrieving the plurality of all-distances sketches of the first node and the plurality of all-distances sketches of the second node comprises:

retrieving the generated all-distances sketch for the first node from the graph;

retrieving the generated all-distances sketch for the second node from the graph;

retrieving the generated all-distances sketches for the first node from each of the adjusted graphs; and retrieving the generated all-distances sketches for the second node from each of the adjusted graphs.

19. The computer program product of claim 18, wherein estimating the similarity of the first node and the second node using the all-distances sketches associated with the first node and the all-distances sketches associated with the second node comprises:

for each adjusted graph, estimating the similarity of the first node and the similarity of the second node using the all-distances sketches generated for the adjusted graph; and averaging the generated similarity estimates to estimate the similarity of the first node and the second node.

\* \* \* \* \*